US009269123B2

(12) United States Patent
Schneider

(10) Patent No.: US 9,269,123 B2
(45) Date of Patent: Feb. 23, 2016

(54) VOLUME RENDERING ON SHARED MEMORY SYSTEMS WITH MULTIPLE PROCESSORS BY OPTIMIZING CACHE REUSE

(71) Applicant: SIEMENS AKTIENGESELLSCHAFT, Munich (DE)

(72) Inventor: Robert Schneider, Rosstal (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 363 days.

(21) Appl. No.: 13/855,818

(22) Filed: Apr. 3, 2013

(65) Prior Publication Data

US 2013/0265318 A1 Oct. 10, 2013

(30) Foreign Application Priority Data

Apr. 5, 2012 (EP) ..................................... 12163399

(51) Int. Cl.
*G06T 1/60* (2006.01)
*G06F 9/50* (2006.01)
*G06T 15/00* (2011.01)
*G06T 15/08* (2011.01)
*G06F 12/08* (2006.01)

(52) U.S. Cl.
CPC ................ *G06T 1/60* (2013.01); *G06F 9/5066* (2013.01); *G06F 9/5083* (2013.01); *G06T 15/005* (2013.01); *G06T 15/08* (2013.01); *G06F 12/0806* (2013.01); *G06T 2210/52* (2013.01)

(58) Field of Classification Search
CPC . G06F 12/0806; G06F 9/5066; G06F 9/5083; G06T 15/005; G06T 15/08; G06T 1/60; G06T 2210/52

See application file for complete search history.

(56) References Cited

U.S. PATENT DOCUMENTS

| 5,579,527 | A * | 11/1996 | Chin et al. | 712/16 |
| 6,750,867 | B1 * | 6/2004 | Gibson | 345/501 |
| 2003/0065892 | A1 * | 4/2003 | Bonola | 711/147 |

(Continued)

OTHER PUBLICATIONS

Steven Parker, Peter Shirley, Yarden Livnat, Charles Hanse, Peter-Pike Sloan. "Interactive ray tracing for isosurface rendering". VIS '98: Proceedings of the conference on Visualization '98, pp. 233-238.; 1998.

(Continued)

*Primary Examiner* — Sing-Wai Wu
(74) *Attorney, Agent, or Firm* — Harness, Dickey & Pierce, P.L.C.

(57) ABSTRACT

A method, system and product are disclosed for volume rendering of medical images on a shared memory system implemented on a multi-socket mainboard with multiple multi-core processors and multiple last level caches, cores that share a cache being united in a socket. The method includes decomposing the image space to be used for rendering in regions, each region including a plurality of tiles; assigning two sockets to each of the decomposed regions; determining a tile enumeration scheme for a region; rendering all tiles within a region according to a determined tile enumeration scheme on the assigned two sockets until the respective region is finished; if a region is finished, assigning the two sockets to another region; and if no region is left, splitting an existing region of un-rendered tiles into sub-regions according to a splitting scheme and applying the steps recursively for the sub-regions.

20 Claims, 8 Drawing Sheets

(56) References Cited

U.S. PATENT DOCUMENTS

2009/0138680 A1* 5/2009 Johnson et al. ............... 712/208
2011/0170756 A1 7/2011 Schneider
2011/0231857 A1* 9/2011 Zaroo et al. .................. 718/104

OTHER PUBLICATIONS

F. Abraham, W. Celes, R. Cerqueira and J. Campos, "A load-balancing strategy for sort-first distributed rendering", in 17'h Brazilian Symposium on Computer Graphics and Image Processing, 2004, pp. 292-299; 2004.
B. B. Labronici, C. Bentes, L. Maria, A. Drummond and R. Farias, "Dynamic screen division for load balancing the raycasting of irregular data", Cluster Computing and Workshops. IEEE Cluster 2009. pp. 1-10,2009.; 2009.
K-L. Ma, J. S. Painter, C. D. Hansen and M. F. Krogh, "A data distributed, parallel algorithm for ray-traced volume rendering", Parallel Rendering Symposium, pp. 15-22, 1993; 1993.
M. E. Palmer, B. Totty, S. Taylor: "Ray Casting on Shared-Memory Architectures. Memory-Hierarchy Considerations in Volume Rendering", IEEE Concurrency, IEEE Service Center, Piscataway, NY, US, vol. 6, No. 1,Jan. 1998, pp. 20-35,XP000737883.; 1998.
S. Whitman, "Dynamic load balancing for parallel polygon rendering", IEEE Computer Graph. and Appl., vol. 14, No. 4, pp. 41-48, Jul. 1994.; 1994.
Huseyin Kutluca et al: "Image-Space Decomposition Algorithms for Sort-First Parallel Volume Rendering of Unstructured Grids"; The Journal of Su percomputing, vol. 15, pp. 51-93, 1997.; 1997.

Stéphane Marchesin et al: "Dynamic Load Balancing for Parallel Volume Rendering"; Eurographics Symposium on Parallel Graphics and Visualization 2006, pp. 43-50.; 2006.
Jason Nieh et al: "Volume Rendering on Scalable Shared-Memory MIMD Architectures"; Proceedings of the Boston Workshop on Volume Visualization, Boston, MA, Oct. 19-20, 1992; pp. 17-24.; 1992.
Rudrajit Samanta et al: "Load Balancing for Multi-Projector Rendering Systems"; Proc. of the SIGGRAPH/Eurographics Workshop on Graphics Hardware, Aug. 1999; pp. 107-116.; 1999.
Jaswinder Pal Singh et al: "Parallel Visualization Algorithms: Performance and Architectural Implications"; Computer, pp. 45-55, 1994.; 1994.
Siham Tabik et al: "Mapping Parallel Loops on Multicore Systems"; in 15th Workshop on compilers for parallel computing (CPC 2010), Vienna. Jul 2010.; 2010.
Partitioning and Load Balancing for Emerging Parallel Applications and Architectures; Karen D. Devine et al.: "Partitioning and Load Balancing for Emerging Parallel Applications and Architectures", Frontiers of Scientific Computing. SIAM, Philadelphia, Jan. 1, 2006, p. 1-29, XP55037760, http://www.cs.sandia.gov/-kddevin/papers/pp04.pdf; 2006; Jan. 1, 2006.
Dynamic Partitioning of Non-Uniform Structured Workloads with Spacefilling Curves; John R. Pilkington et al.: "Dynamic Partitioning of Non-Uniform Structured Workloads with Spacefilling Curves", IEEE Transactions on Parallel and Distributed Systems, IEEE Service Center, Los Alamitos, CA, US, vol. 7, No. 3, Jan. 3, 1996, p. 288-300, XP000591044, ISSN: 1045-9219; 1996; Mar. 1, 1996.

\* cited by examiner

FIG 6

| 12 | 13 | 14 | 15 |
|----|----|----|----|
| 8  | 9  | 10 | 11 |
| 4  | 5  | 6  | 7  |
| 0  | 1  | 2  | 3  |

FIG 7

| 5 | 6 | 9  | 10 |
|---|---|----|----|
| 4 | 7 | 8  | 11 |
| 3 | 2 | 13 | 12 |
| 0 | 1 | 14 | 15 |

FIG 8

| 10 | 11 | 14 | 15 |
|----|----|----|----|
| 8  | 9  | 12 | 13 |
| 2  | 3  | 6  | 7  |
| 0  | 1  | 4  | 5  |

FIG 9

| 3 | 7 | 11 | 15 |
|---|---|----|----|
| 2 | 6 | 10 | 14 |
| 1 | 5 | 9  | 13 |
| 0 | 4 | 8  | 12 |

0011

| 5 | 7 | 13 | 15 |
|---|---|----|----|
| 4 | 6 | 12 | 14 |
| 1 | 3 | 9  | 11 |
| 0 | 2 | 8  | 10 |

0101

| 6 | 7 | 14 | 15 |
|---|---|----|----|
| 4 | 5 | 12 | 13 |
| 2 | 3 | 10 | 11 |
| 0 | 1 | 8  | 9  |

0110

| 12 | 13 | 14 | 15 |
|----|----|----|----|
| 8  | 9  | 10 | 11 |
| 4  | 5  | 6  | 7  |
| 0  | 1  | 2  | 3  |

1100

| 10 | 11 | 14 | 15 |
|----|----|----|----|
| 8  | 9  | 12 | 13 |
| 2  | 3  | 6  | 7  |
| 0  | 1  | 4  | 5  |

1010

| 9 | 11 | 13 | 15 |
|---|----|----|----|
| 8 | 10 | 12 | 14 |
| 1 | 3  | 5  | 7  |
| 0 | 2  | 4  | 6  |

1001

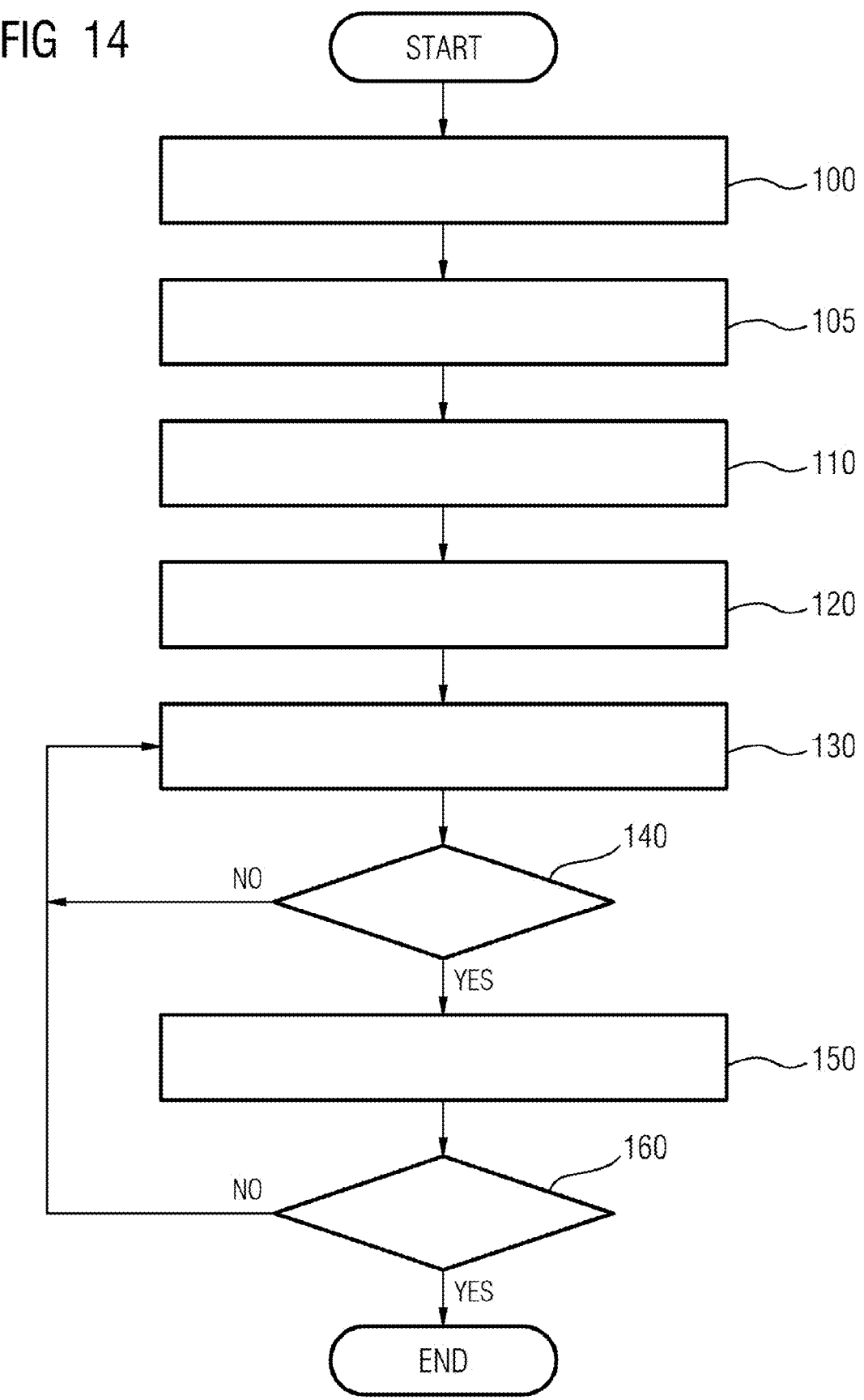

VOLUME RENDERING ON SHARED MEMORY SYSTEMS WITH MULTIPLE PROCESSORS BY OPTIMIZING CACHE REUSE

PRIORITY STATEMENT

The present application hereby claims priority under U.S.C. §119 on European patent application number EP12163399 filed Apr. 5, 2012, the entire contents of which are hereby incorporated herein by reference.

FIELD OF THE INVENTION

At least one embodiment of the present application generally relates to the field of image processing, particularly to volume rendering and particularly refers to an approach to optimize cache reuse by taking into account hardware architecture.

BACKGROUND

In many fields of engineering and science like medico-technical image processing, visualizing large quantities of image data quickly is a major concern. Because of the size of modern voxel datasets, especially in medical imaging, to calculate all items of a volume dataset, an enormous amount of memory accesses have to take place. Since the computation power improvement of the hardware due to parallelization advances by increasing the number of computation cores is larger than the memory bandwidth and memory latency advancement, for volume rendering algorithms, the volume data memory access performance in many cases becomes the limiting factor that determines the overall performance. To achieve an optimal performance it is therefore crucial to minimize the impact of memory accesses by maximizing cache reuse. Many known volume rendering procedures show significant disadvantages with respect to cache reuse.

Depending on the respective computer platform different approaches for volume rendering are known. In case of a shared memory system using multi-core processors a popular approach is to distribute the workload necessary to render the image by decomposing the image space, which is used for volume or image rendering. The result image is factorized into many small tiles, where each tile holds a part of the full image. Then, the different parts of tiles of the image may be calculated on different hardware elements and/or by different threads.

On most hardware, the data to be accessed is cached, so that once a data set was loaded it remains in a memory cache for some time. The access to a cache memory is much faster than to standard memory. The memory access strategy is optimal if every data set in a random access memory (RAM) that contains voxel data is loaded only once into the cache for each rendered image or never. Typically, the memory system comprises caches in multiple hierarchies consisting of multiple cache levels where the last level cache (LLC) of this hierarchy typically is shared between all cores.

Mainly there do exist two classes for volume rendering on multiprocessor systems:
- object space decomposition algorithms, where the volume is decomposed into sub-blocks and
- image space decomposition algorithms, where the result image is decomposed into tiles and
- a combination of the before mentioned approaches.

The present application is directed to the second category, namely to image space decomposition algorithms and may be combined with object space decomposition schemes.

Generally, image space decomposition algorithms are also used in the context of raytracing or rasterizing graphic primitives like meshes and splines.

In the paper "Image-space decomposition algorithms for sort-first parallel volume rendering of unstructured grids", Kutluca H. et al, 1997 three general categories for image space decomposition algorithms are described:
1. Static decomposition
2. Dynamic decomposition and
3. Adaptive decomposition.

Static decomposition schemes decompose the image into regions that are assigned statically to the available threads. This static load balancing approach suffers from the problem that the rendering load may not be distributed evenly across the processors.

Dynamic load balancing is based on the idea that each thread queries dynamically for a new workload as soon as it has finished its previous rendering work. Dynamic algorithms decompose the image into small tiles. Each thread receives a tile, computes the image and when done, it requests the next free tile that has to be rendered. This approach guarantees that no thread is idle while there is still work to do.

An improvement to this basic dynamic algorithm is to additionally adapt the size of the workloads. Here at the beginning not just one tile is queried by a thread, but multiple tiles. Later, when the number of unhandled tiles has decreased, the number of the queried tiles decreases until just one tile is queried and one arrives at the basic algorithm (see S. Parker et al. 1998).

This modification is based on the idea to reduce thread contention at the beginning, while arriving at the basic scheme to not loose granularity to allow still a fine grained work load distribution.

Another proposed modification is to decompose the initial image into equally sized rectangular regions, where each processor is assigned to such a region. Each region then consists of smaller tiles and each processor handles the tiles of a block in scanline order. When a processor is done computing all its tiles, it goes to the next processor in scanline order that is not finished with its workload and grabs tiles that still have to be calculated. Such an algorithm improves the tile locality for each processor at the beginning, since at the beginning each processor works on tiles that are close to each other. How large this effect is depends on how the overall workload is distributed across the initial regions.

Another dynamic algorithm for tile decomposition was proposed by Whitman (S. Whitman, 1994). Here, the image is decomposed into rectangular regions, where the number of regions is at least as large as the number of processors. Initially each processor is assigned to such a region and when this region is finished, it requests the next free region. Inside of a region the internal workload is handled along scanlines. When for a processor no free region is left, the workload of the processor that has the most work items open is split into two workloads. Since the open workloads form a rectangular region, the split decomposes that rectangular region into two smaller rectangular regions and the free processor handles the lower one, while the other processor continues his work on the upper part. By always starting to work on a region at the upper part, it is guaranteed that the current processor can continue on his workload even during a split, until it finishes its assigned region. A lock prevents that more than one processor at a time tries to split the same region.

Adaptive decomposition algorithms use additional assumptions to create the image decomposition to take a varying complexity distribution across the image into account. Such additional data is usually created by an estimation of the expected workload that has to be handled, with the goal to create a decomposition of the image so that all created regions have the same amount of expected workload. Often such approaches use space partitioning algorithms to calculate a solution.

Other additional information that can be used is the workload of the previously calculated image, assuming that during an interaction the differences between the workload required in a region does not change to a larger degree between two image calculations.

Adaptive algorithms are combined with static or dynamic algorithms to distribute the workload. When combined with dynamic algorithms, the assumption information can also be used to influence the work distribution within the dynamic scheduling procedure, e.g. by sorting the tiles according to the expected workload and first handle those tiles with higher expected workload.

When doing volume rendering on a volume data format that stores the volume as a linear slice array, the caching behavior of the volume renderer is strongly influenced by the orientation of the volume relative to the viewing camera. In US 2011/0170756, the entire contents of which are hereby incorporated herein by reference, an algorithm was presented that allows overcoming this issue for calculating the volume samples on a regular grid, which e.g. is satisfied in the case of volume rendering using an orthographic projection. In case of a 3-dimensional block within a 3-dimensional regular grid, it was shown how to find a permutation of the sampling positions that optimizes cache reuse, when sampling the volume voxels in a sequence that is defined by that permutation.

Further details on the above mentioned approaches, the entire contents of each of which is hereby incorporated herein by reference, may be found e.g. in:

F. Abraham, W. Celes, R. Cerqueira and J. Campos, "A load-balancing strategy for sort-first distributed rendering", in 17th Brazilian Symposium on Computer Graphics and Image Processing, 2004, pp. 292-299.

H. Kutluca, T. M. Kurc and C. Aykanat. "Image-space decomposition algorithms for sort-first parallel volume rendering of unstructured grids", The Journal of Supercomputing, vol. 15, pp. 51-93, 1997.

B. B. Labronici, C. Bentes, L. Maria, A. Drummond and R. Farias, "Dynamic screen division for load balancing the raycasting of irregular data", Cluster Computing and Workshops. IEEE CLUSTER 2009. Pp. 1-10, 2009.

K-L. Ma, J. S. Painter, C. D. Hansen and M. F. Krogh, "A data distributed, parallel algorithm for ray-traced volume rendering", Parallel Rendering Symposium, pp. 15-22, 1993.

S. Marchesin, C. Mongenet and J-M. Dischler, "Dynamic load balancing for parallel volume rendering", Eurographics Symposium on Parallel Graphics and Visualization 2006, pp. 43-50.

J. Nieh and M. Levoy, "Volume rendering on scalable shared-memory MIMD architectures", in Proc. Of the 1992 Workshop on Volume Visualization, October 1992, pp. 17-24.

M. E. Palmer, B. Totty, S. Taylor: "Ray Casting on Shared-Memory Architectures. Memory-Hierarchy Considerations in Volume Rendering", IEEE Concurrency, IEEE Service Center, Piscataway, NY, US, vol. 6, No. 1, January 1998, pp. 20-35, XP000737883.

S. Parker, P. Shirley, Y. Livnat, C. Hansen, P.-P. Sloan. Interactive ray tracing for isosurface rendering. VIS '98: Proceedings of the conference on Visualization '98, Pages: 233-238.

R. Samanta, J. Zheng, T. Funkhouser, K. Li and J. P. Singh, "Load Balancing for multi-projector rendering systems", in Proc. Of the SIGGRAPH/Eurographics Workshop on Graphics Hardware, August 1999, pp. 107-116.

R. Schneider, "Method for sampling volume data of an object in an imaging device", United States Patent Application No. 20110170756, mentioned above.

J. P. Singh, P. Jaswinder and A. Gupta and M. Levoy. Parallel Visualization Algorithms: Performance and Architectural Implications. Computer, pages 45-55, 1994.

S. Tabik, F. Romero, G. Utrera and O. Plata, "Mapping parallel loops on multicore systems", In 15th Workshop on compilers for parallel computing (CPC 2010), Vienna, July 2010.

S. Whitman, "Dynamic load balancing for parallel polygon rendering", IEEE Computer Graph. and Appl., vol. 14, no. 4, pp. 41-48, July 1994.

SUMMARY

One problem to be solved in at least one embodiment is to improve upon or even overcome at least one of the disadvantages of known systems mentioned above and in at least one example embodiment, to provide an approach that allows to optimize cache reuse across tiles for the whole cache hierarchy, taking into account that massive LLC caches can be exploited across tiles during volume rendering. Generally, the overall performance of a volume rendering method within a shared memory system with one or multiple processors should be optimized. A further embodiment is directed to provide a dynamic load balancing also for large workload differences across the set of tiles by minimizing synchronization overhead. The synchronization should especially minimize lock contention so that all threads are busy and not waiting because of synchronization instead of rendering the tiles. The proposed method of at least one example embodiment should be non-blocking (without using locks) or should at least minimize the number of situations that require locks.

Further embodiments result from the depending claims.

In the following, at least one embodiment of the method is described in more detail below. Advantages, features and alternative embodiments which will be mentioned with respect to the method may also be applied to the apparatus and/or to the product and vice versa. The functional features may be implemented in software and/or in hardware. At least one embodiment of the invention is also directed to a medical appliance for volume rendering which uses the method according to at least one embodiment.

A method is provided in at least one embodiment for image rendering on a shared memory system with one or multiple processors. Each processor may comprise one processor core or a set of cores. One core may be assigned to one cache. It is also possible that several cores share at least one cache, particularly a last level cache. Typically, the processors may calculate instructions of at least one thread in parallel. Those processor cores that share a cache are defined as a socket. The method of at least one embodiment comprises:

Decomposing the image space to be used for rendering in regions, wherein each region comprises a plurality of tiles;

Assigning all available sockets to regions, wherein two sockets are assigned to each of the decomposed regions for the purpose of rendering;

Determining a tile enumeration scheme for a region wherein the tile enumeration scheme comprises a regular and a corresponding reverse indexing for tile calculation;

Rendering tiles within a region according to the determined regular indexing of the tile enumeration scheme on the assigned first socket and according to the determined reverse indexing of the tile enumeration scheme on the assigned second socket until a region is finished;

If a region is finished: Assigning the two sockets to another (free) region;

If no region is left: Splitting an existing region of un-rendered tiles into sub-regions according to a splitting scheme and applying the steps of determining and/or rendering recursively for the sub-regions.

According to another example embodiment of the invention there is provided an apparatus for image rendering on a shared memory system with one or multiple processors, wherein each processor may comprise at least one core and wherein one or more cores are assigned to at least one cache and may calculate instructions of at least one thread in parallel, wherein cores that share a common cache are united in a socket, comprising:

a decomposition unit which is adapted to decompose the image space to be used for rendering in regions, wherein each region comprises a plurality of tiles;

an assigning unit which is adapted to assign sockets to each of the decomposed regions for the purpose of rendering, wherein always two sockets are assigned to one region;

a memory unit for storing a determined tile enumeration scheme for a region wherein the tile enumeration scheme comprises a regular and a corresponding reverse indexing for tile calculation a rendering unit which is adapted to render all tiles of the plurality of tiles within a region according to the determined tile enumeration scheme on the assigned sockets until the respective region is finished a splitting unit which is adapted to split the region of un-rendered tiles into sub-regions according to a splitting scheme if tiles in other regions are still un-rendered and which is adapted to accessing the memory unit for determining the tile enumeration scheme for the sub-regions and/or the rendering unit for rendering recursively for the sub-regions, and if a region is finished, the splitting unit is adapted to assign the two sockets to another un-rendered region and if no completely un-rendered region is left: the splitting unit splits a region with un-rendered tiles into sub-regions according to a splitting scheme and is adapted to apply the steps of determining and/or rendering recursively for the sub-regions.

Generally, embodiments of the method mentioned above may be implemented in software or in computer code to be executed on a computer. Alternatively, embodiments of the method may be implemented in a graphics processing unit (GPU) or in hardware modules combined with software modules. The hardware modules are then adapted to perform the functionality of the steps of the embodiments of the method, described above. Accordingly, it is also possible to have a combination of hardware and software modules. The modules are preferably integrated into an existing medical computer-based environment.

Another example embodiment of the invention is to be seen in a computer program being loadable in a memory of a computer, wherein the computer program is adapted to carry out the steps of the embodiments of the method as mentioned above.

Moreover, embodiments of the invention relate to a computer readable medium including program instructions which when executed by a processor of a computer system cause the processor to perform the method for image rendering on a shared memory system with one or multiple processors as described above.

BRIEF DESCRIPTION OF THE DRAWINGS

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

FIG. 6 shows an example graphical representation of a linear tile enumeration scheme;

FIG. 7 shows an example graphical representation of a tile enumeration scheme based on a Hilbert curve;

FIG. 8 shows an example graphical representation of a tile enumeration scheme based on a static subdivision;

FIG. 9 shows an example graphical representation of a dynamic subdivision scheme with six possible results;

FIG. 14 is a flow chart according to an example embodiment of present invention.

DETAILED DESCRIPTION OF THE EXAMPLE EMBODIMENTS

Figure 1:
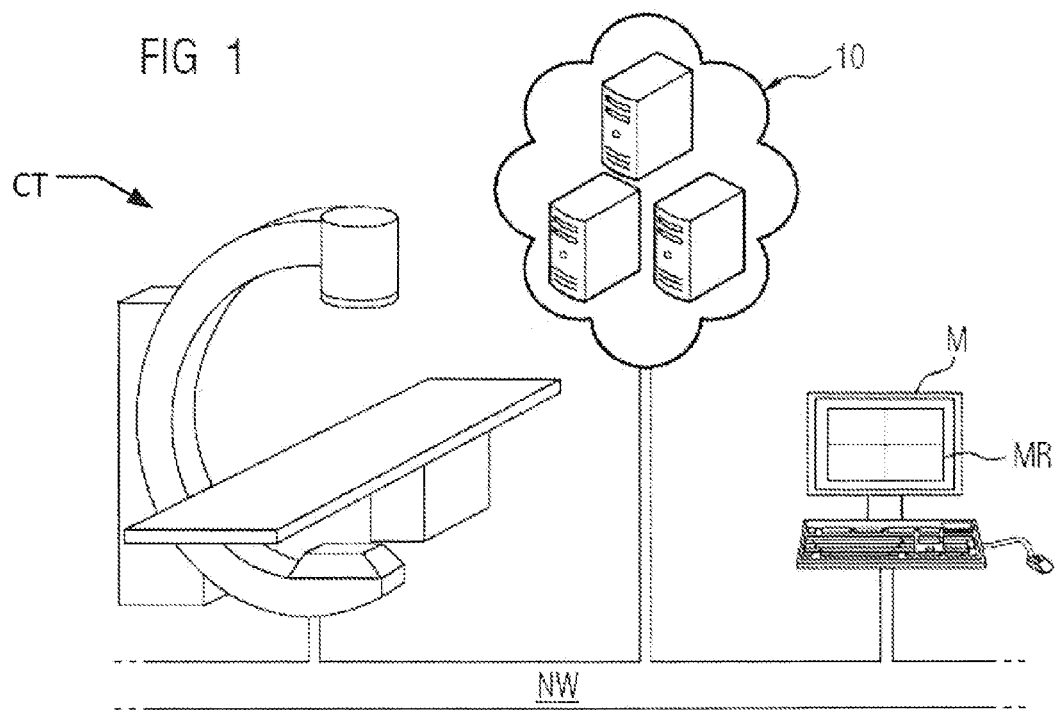
FIG. 1 is a schematic block diagram according to one embodiment of a computer implemented medical system used for volume rendering.

A method is provided in at least one embodiment for image rendering on a shared memory system with one or multiple processors. Each processor may comprise one processor core or a set of cores. One core may be assigned to one cache. It is also possible that several cores share at least one cache, particularly a last level cache. Typically, the processors may calculate instructions of at least one thread in parallel. Those processor cores that share a cache are defined as a socket. The method of at least one embodiment comprises:

Decomposing the image space to be used for rendering in regions, wherein each region comprises a plurality of tiles;

Assigning all available sockets to regions, wherein two sockets are assigned to each of the decomposed regions for the purpose of rendering;

Determining a tile enumeration scheme for a region wherein the tile enumeration scheme comprises a regular and a corresponding reverse indexing for tile calculation;

Rendering tiles within a region according to the determined regular indexing of the tile enumeration scheme on the assigned first socket and according to the determined reverse indexing of the tile enumeration scheme on the assigned second socket until a region is finished;

If a region is finished: Assigning the two sockets to another (free) region;

If no region is left: Splitting an existing region of un-rendered tiles into sub-regions according to a splitting scheme and applying the steps of determining and/or rendering recursively for the sub-regions.

In the following there is given a definition of terms used within this application.

The term "image" is to be construed broadly, comprising 2 dimensional images or 3D volumes or time sequences (videos etc.). Particularly, the method is used for volume rendering and refers to medical volume data sets. The method may be applied in the context of medical image processing and/or may be implemented in a dynamic link library (as DLL-Code) with atomic instructions. Moreover, the method may be implemented or integrated in a plug-in with a plug-in interface to be connected to a host application and/or to other services.

Depending on the actual hardware used for image or volume rendering different physical scenarios may be differentiated. A shared memory system that is used for doing volume rendering can consist of one processor that internally has a set of processing cores, which is called a 1-socket system, or multiple such processors with multiple processor sockets. In some cases a processor that "sits" on a physical mainboard socket internally could be built from multiple processors that are packed into the same processor socket, e.g. the AMD Processor Magny-Cours is such a Multi-Chip-Module (MCM) processor.

In the following the term "multi socket systems" is to be construed in the sense of the number of logical processors that have a shared last level cache (LLC), not the number of physical sockets.

A cache is to be construed as a memory with fast access. It may be shared by other cores or it may be private (assigned to a specific core).

It is possible that all cores are on the same processor. Alternatively, at least one embodiment of the method could also be applied for scenarios in which there are multiple sockets within a system.

A socket is to be construed as a set of processors cores that share a cache or a LLC respectively. According to an aspect of the application it is not necessary that there is just one memory cache level available; often a hierarchy of such cache levels exists. The lowest level cache usually is the smallest one but the fastest, the following levels increase in size but decrease on cache access performance.

A region is a part of the image space to be used for rendering. A region is decomposed in sub-regions or tiles. The tiles within a region can be processed in any sequence. Generally, the size of the tiles is not restricted. Preferably, each tile has the same size and a rectangular shape.

Decomposing and/or splitting is a subdivision of the image space initially to be used for rendering. For example an image may initially be decomposed into two regions, where to each region two sockets are assigned. One initial region may be an upper halve of the image, while the second one is a lower halve of the image. The term "splitting" is mainly used for later subdivisions or image regions or sub-regions preferably those which are un-rendered and have rendering workload left.

Definition of regular and reverse indexing of a sequence:

Let a region be composed of a number of T tiles, where each tile has the same size. The tiles within such a region can be enumerated in a linear sequence, with tile indices $i0, i1, \ldots iT-2, iT-1$ in many ways. There are as many enumeration schemes possible as there are permutations of the set of indices. Assuming an enumeration sequence was chosen, there are two possible options to traverse this sequence. The first one starts with $i0$ and then steps through this sequence by increasing the indices, the second one starts with $iT-1$ and steps through the sequence by decreasing the indices. In the following the increasing traversal scheme is called "regular indexing" and the second scheme is called "reverse indexing".

Definition of a Cache Symmetric Tile Enumeration Scheme:

An enumeration scheme is defined as "cache symmetric" if its regular indexing as well as reverse indexing scheme show the same cache reuse behavior. This means that after having traversed x tiles in each direction of the sequence, in average the same amount of cache reuse will be achieved, which has to be satisfied for all such x. This definition basically means that the scheme then does not prefer any traversal direction against the other. Assuming symmetric load, the number of finished tiles will be in average the same.

Definition of Atomic Instructions:

Atomic instruction are CPU instructions that are processed in a block and which cannot be interrupted (by the operating system) and therefore do not need a lock. When analyzing dynamic scheduling schemes, one has to differ between algorithms that can be implemented very efficiently as non-blocking using atomic instructions and those that rely on locks. Simple dynamic schemes have the advantage that they can be implemented straightforward using atomic operations. The algorithm presented by Whitman (1994) is an example of an algorithm that is nearly lock-free. A lock is only needed when splitting up a region, in order to prevent that other processors at the same time are also performing such a split. All other threads that do not try to split the same region at the same time are not blocked—guarantying that the lock has low performance impact. According to an aspect of present invention the method is completely non-blocking or at least nearly lock-free.

A central idea of the method described above is to have three essential steps:
1. Decompose the image into regions with tiles
2. Assign sockets or pairs of sockets to the regions for the purpose of rendering
3. Once a region has been computed, search for the region that has the largest number of tiles open, then split the remaining workload and assign the involved sockets to the two newly or created sub-regions.

Compared to the approach, presented by Whitman (1994, see above) this method has many additional degrees of freedom, since:
multiple sockets are allowed to work on a region
tiles can be handled in any sequence
the split operation is general, without a restriction to have a concrete geometric form.

Many existing scheduling approaches start with macro regions (consisting of a set of tiles) that (for the first iteration) take tile locality into account—and then start to loose tile locality when no macro tile is available and the phase starts where tiles from other macro tiles are processed ("stolen"). In situations where workload difference between tiles is very large, macro tiles can have an enormous workload imbalance. Some processors could have finished the initial phase very early and then start to pollute the locality property. Compared to the algorithm presented by [Whitman] method proposed in this application uses less split operations and has better cache locality parameters. Advantageously, present invention minimizes the number of possible split operations also for irregular workloads, since they destroy locality. Further, the impact of split operations is minimized.

In an embodiment, the core(s) is/are a physical core. In another embodiment the core(s) is/are a logical or virtual core, for example by applying simultaneous multithreading or hyperthreading.

According to an example embodiment, two sockets are allowed to render a region in parallel. Further, in a multiple socket scenario the pairs of sockets process their processing load in parallel and the work will be re-distributed in case a pair of sockets has finished its work.

Pursuant to a further embodiment, the image space is decomposed or splitted in regions. Preferably, this is only done in a 4 or more than 4 socket scenario and only if a pair of threads has finished and tiles of another pair remains un-rendered. The number of the regions should be at least half of the number of sockets. If there is only one socket, this socket works on tiles of a region. In the two socket scenario two sockets process rendering instructions for a single region. This is a major difference to the dynamic algorithm proposed by Whitman, 1994, described as state of the art above. Another scenario is the four socket scenario in which two socket pairs (with each two sockets) work on two regions. Several simplifications are possible in this case which will be described in more detail in the detailed description. Usually, an even number of sockets is used. In the uneven case (unlikely), the number of sockets may be artificially increased by 1 and one will arrive again at an even scenario. One socket would then never do any work, and the region would just be handled by the other socket that is assigned to the same tile.

According to an example embodiment of the invention, the tiles of a region can be worked on in any sequence and thus in a sequence that is optimized with respect to cache reuse and corresponding locality properties. Thus, the processing sequence is configurable, also dynamically. However, it is also possible to use a static scheme for tile enumeration. Further, it is possible to combine a static enumeration with a dynamic enumeration scheme. Particularly, it is possible to enumerate macro regions statically and to enumerate tiles within such a macro region dynamically or vice versa (dynamically enumerating macro regions and statically enumerating tiles with the macro region).

In another embodiment, the image or volume to be rendered is stored in a linear layout, for example as a linear slice array. Alternative embodiments relate to other storage schemes, for example as a plurality of small three-dimensional sub-blocks or hierarchically, where the indices of the swizzled dataset are permutated, so that voxels with close indices are closer together in 3D space than it would be the case with a linear memory arrangement. When accessing memory, each voxel index of a linear layout is transformed into its swizzled index before it is processed (swizzling). Another approach to reorganize the data to be rendered so that memory accesses can be optimized with respect to cache locality is known as bricking (see for example Parker et al., 1998, see above).

In yet another embodiment, decomposing and/or splitting is/are based on a splitting scheme, which is based on a metric f(B) which is used to detect which one of a plurality of possible decompositions or splittings has best cache locality properties. In this respect it has to be noted that decomposing and/or splitting is not restricted to a specific geometric form and may be based on different algorithms. This makes the algorithm more flexible.

According to another example embodiment of the invention there is provided an apparatus for image rendering on a shared memory system with one or multiple processors, wherein each processor may comprise at least one core and wherein one or more cores are assigned to at least one cache and may calculate instructions of at least one thread in parallel, wherein cores that share a common cache are united in a socket, comprising:

decomposition unit which is adapted to decompose the image space to be used for rendering in regions, wherein each region comprises a plurality of tiles;

an assigning unit which is adapted to assign sockets to each of the decomposed regions for the purpose of rendering, wherein always two sockets are assigned to one region;

a memory unit for storing a determined tile enumeration scheme for a region wherein the tile enumeration scheme comprises a regular and a corresponding reverse indexing for tile calculation a rendering unit which is adapted to render all tiles of the plurality of tiles within a region according to the determined tile enumeration scheme on the assigned sockets until the respective region is finished a splitting unit which is adapted to split the region of un-rendered tiles into sub-regions according to a splitting scheme if tiles in other regions are still un-rendered and which is adapted to accessing the memory unit for determining the tile enumeration scheme for the sub-regions and/or the rendering unit for rendering recursively for the sub-regions, and if a region is finished, the splitting unit is adapted to assign the two sockets to another un-rendered region and if no completely un-rendered region is left: the splitting unit splits a region with un-rendered tiles into sub-regions according to a splitting scheme and is adapted to apply the steps of determining and/or rendering recursively for the sub-regions.

The apparatus may refer to hardware and might be implemented on a multi chip module (MCM)-system.

In the following, embodiments of the method will be described in more detail, assuming that the complete image that has to be rendered is composed into various regions, where each region consists of tiles. The set of all tiles can be enumerated with indices starting with 0 up to N−1, when there are overall N such image tiles. The global image mapping function allows converting an index of a tile to the actual tile information that can be used by a rendering unit—which means the start position and size within the 2 dimensional image. The tile indices within a region are always global indices, which has the impact that knowing a tile index completely specifies the tile globally.

Assign 2 Sockets to a Region:

Generally, more than one socket is allowed to work on a tile region. The idea behind this is that if it would be possible to assign more sockets to a region—of course without increasing the overhead or decreasing temporal or spatial tile locality—then it is possible to reduce the number of splits that are necessary and hence improve the caching effect which is disturbed by any split operation. It is possible to assign 2 sockets to a region without decreasing overhead or cache locality. This allows to decrease the required number of splits that will occur, since an R socket problem behaves in many aspects as an R/2 socket problem.

Special Case: 2 Sockets

In contrast to the Whitman, 1994 approach only one single region is generated. Both sockets work in parallel on that region—but in a manner that does not require any splits.

According to an embodiment, the following strategy is implemented:

Create a tile enumeration with indices 0, 1, ... N−1 of the single region that has the properties that it optimizes tile locality, minimizes cache thrashing and is cache symmetric.

Let the first socket start to render the tiles with regular indexing scheme, while the other socket starts to render the tiles with reverse indexing scheme. Because of the cache symmetry property of the enumeration, no socket has an inherent performance advantage over the other. Any performance differences will just result from the actual load differences that occur when calculating the tiles.

Take care that overall not more than N tiles are rendered by the 2 sockets. When finally the last of the N tiles is rendered, the region is finished, and this completely without having triggered any splits.

Such a 2-socket approach can be implemented in a way that is very similar to a 1 socket scenario by using only atomic operations, where no locks are required.

There are multiple ways how this can be achieved. The simplest one is to use an image tile counter for the number of tiles that have been already handled. Use an atomic increase intrinsic on this variable before a socket requests for the next tile. Only when this is <=N continue to work on the tiles.

However such an approach does not scale well to the general socket case which we want to solve, therefore the following approach is provided that scales:

Let s1 be the index of the next free tile of the first socket, while s2 be the index of the next free tile of the second socket. Let N be the number of all tiles that are available.

Both those integer values are stored into a 64 bit integer variable; so that the lower 32 bits contain s1 and the upper 32 bits contain N−1−s2. The upper part is reversed so that a single atomic add operation can be used to handle the case where a tile is queried from the first socket as well as the other socket.

In Pseudo Code the query method for the next free tile of a socket could look like this, using a 64 bit atomic add operation:

```
__int64 aSocketPairData = 0;
TileID Request_next_tile_ID(int aSocketID)
{
    const __int64 CONST_ADD_ARRAY[2] = { 1, 0x100000000};
    __int64 aAddValue = CONST_ADD_ARRAY[aSocketID]
        __int64 aResult = atomic_add(aSocketPairData,
aAddValue);
Int aIndexSocket1;
Int aIndexSocket2;
Determine Socketindices(aResult ,&aIndexSocket1 ,& aIndexSocket2)
        If (aIndexSocket1+ aIndexSocket2<=NumTotalTiles)
        {
            If (0==aSocketID)
            {
                return convert_to_tile_ID(aIndexSocket1 −1);
}
            If (1==aSocketID)
            {
                return convert_to_tile_ID(NumTotalTiles − aIndexSocket2);
}
    }
}
```

General Socket Case

Assuming that the number of sockets R is even and larger than 2.

The image is decomposed into at least R/2 regions and to each region 2 sockets are assigned, where each pair of sockets within a region behaves as in the 2 socket case. One socket starts to process or handle the tiles within the region using regular indexing, while the other socket uses reverse indexing.

Whenever a region is finished, search for the region that has the largest workload left, then split this region into 2 regions, where each region again is then handled by two sockets after the split. The split is done such that the 2 sockets of the region (also called pair of sockets) that has workload left can continue with their workload undisturbed and without losing tile locality. So the socket that was using regular indexing can continue after the split in increasing order, while the socket that was using reverse indexing can also continue to do so. This is continued until there is no work left.

Split Operation:

Region1: Start socket A1, End socket B1-Start index S1, End index E1

Region2: Start socket A2, End socket B2,

Assume that Region2 runs out of work and Region1 has most number of tiles left, then we would do a split Region1: Start socket A1, End socket A2-Start Index S1

Region2: Start socket B2, End socket B1-End Index E1

The split is only done when there is work left. During a split the tile indices are recalculated so that each resulting region receives halve of the number of remaining tiles.

Because of the split operations, which could not occur in the 2 socket case, the thread workload handling cannot be handled as simple as in the 2 socket case. Nevertheless, this scenario can in general be implemented nearly lock-free. However, a lock is required to protect the split of a region itself, so that no other pair of sockets can split a region at the same time. This lock only affects those threads that try to split this region at the same time. Also the threads of the region that is split can continue to work on their tiles without interruption. Additionally it is guaranteed that no thread from the socket that has run out of work starts to split a different region.

Compared to the 2 socket case, in the general case, more information needs to be stored to describe a socket pair. In addition to the start and end indices, also the socket IDs of the pair have to be stored.

A region is then described by the following data:

Socket ID that uses regular indexing

Socket ID that uses reverse indexing

Next free Tile ID in increasing order

Next free Tile ID in decreasing order.

When increasing the number of sockets, more bits are required to store the socket IDs in a pair. On the other side, the maximal possible difference between the Tile IDs in increasing order and the Tile IDs in decreasing order becomes smaller, since the image is decomposed into more regions. In order to save bits, in another variant of the data structure, this is taken into account:

A region is described by the following data, stored bit-compressed:

Socket ID that uses regular indexing

Socket ID that uses reverse indexing

Next free Tile ID in increasing order

The difference between the next free tile in decreasing order and the next free tile ID in increasing order.

This data is bit-compressed into a variable type that is large enough and that can be handled with an atomic operation—in this case a 64 Bit variable is used. Instead of using an atomic add operation, the atomic operation compare-and-swap (CAS) is used—which is flexible enough to detect a modification of a region, even if another thread currently performs an index modification or a split on that region. In case that a modification occurred on the region processing is continued, the thread takes this into account and retries.

The key here is that only atomic operations are performed on the data that describes a region—which guarantees that a region is always described consistently.

In the case when there is no work left, the region that has most work left has to be searched and a split of that region has to be triggered. A lock is used when a region needs to be splitted, so that other sockets that want to split the same region do not interfere. It also has to be guaranteed that no other thread from the socket that has run out of work starts to split a different region. Besides of this special case, only atomic operations—mostly using the CAS instruction—are required.

For the special case of 4 sockets some parts of the algorithm can be simplified compared to the general case. Here it is possible to implement the algorithm without having to use locks and hence to arrive also here at a very efficient non-blocking scheme that uses only atomic operations.

Special Case: 4 Sockets

The 4 socket case allows various simplifications, which result mostly from the fact that here only 2 pairs of regions are involved. A very important simplification is that there is no need to search for the region that contains the maximum number of free tiles. Since there are only 2 regions, when one region runs out of work, the remaining one is the only region that can be split. Another simplification is that there cannot be 2 different pairs that try to split a third pair at the same time. Probably the most important difference compared to the general case is that the whole data that describes the 4 socket case can on many processor architectures still be described in one variable that can be modified using atomic operations only. The 4 socket implementation relies on 128 bit atomic instructions.

Here, the lower 64 bit describe the data to represent the first socket pair, while the upper 64 bit describe the second socket pair. Because of such 128 atomic operations, the full split can be executed with one atomic instruction, guarantying that no interruption can occur here. This allows to remove the lock that is used in the general case and to simplify the remaining code which in the general case must be able to cope with an interrupted split where 1 region was already updated, but not the second one.

In pseudo code, our 4 socket method for querying the next tile looks like this:

```
___int64* aSocketPairDataPtr;
TileID Request__next__tile__ID(int aSocketID)
{
TileID aTileID(-1);
Do
{
        aRetry = false;
        ___int128 aResult = atom-
ic__read__using__128__CAS(aSocketPairData);
Int64 aSocketPairArray[2];
determineSocketPairs(aResult aSocketPairArray)
// we know that this socket pair data is consistent because
of the 128 bit access
if (work__left(aSocketPairArray))
{
Int aSocketPairID = find__socket__Pair(aSocketID, aSocketPairArray);
Update__SocketPair__using__atomic__64__CAS(aSocketPairID, aSocketPairArray, &aTileID, &aRetry,&aSplitNecessary);
If(aSplitNecessary)
    {
        Split__data__using__128__CAS(aSocketPairID, aSocketPairArray, &aRetry);
    }
}
}
While (true==aRetry);
return aTileID;
}
```

The Update_SocketPair_using_atomic_64_CAS and the Split_data_using_128_CAS can detect using the CAS atomic instruction if any socket ID within the pairs is modified compared to the initial 128 bit query at the start of the Do-While loop. If such a socket ID change is detected, which means that one or multiple split operations were applied, the aRetry Flag is set, which triggers a restart of the loop. If no socket ID change is detected, no split has happened, or multiple splits have happened that have resulted in the same socket distribution across all pairs. In the latter case only the start end tile index data was modified, which would be detected by the CAS instructions.

The Update_SocketPair_using_atomic_64_CAS method tries to modify the socket pair data and if successful sets the aTildID data which is returned. This modification is only done if no package was changed and there is actually work left to do. The CAS atomic instruction guarantees that this is only done if the assumptions under which the update was calculated did not change. In case that only the socket indices were changed but no sockets were reassigned, the assumptions are updated and a CAS update is triggered again. If no work is left, the method sets the aSplitNecessary flag to trigger a split. When a split is triggered, the Split_data_using 128_CAS is called which does a recalculation of the socket pair data and tries to perform the split using a 128 bit CAS instruction. The split is only done when work is left and no socket ID within the pairs has changed. Again the CAS atomic instruction guaranties that this is only done if the assumptions under which the split was calculated did not change. In case that only the socket indices were changed but no sockets IDs, the assumptions are updated and a CAS update is triggered again.

It is possible to call the split method without using a lock, since only the first thread that is able to perform the split will do the split operation, the remaining threads would detect that socket pair IDs have changed and a complete retry of the loop is triggered for those threads.

Indexing the Tiles within a Region

The tile enumeration scheme is chosen so that the cache reuse potential across tiles is optimized, without knowing details about the concrete amount of cache lines that will be touched by the tile rendering unit. Hence, this cache reuse optimization problem is different from the one that the renderer has to solve when rendering a tile, since only very general information that results from the tile location within the image may be exploited.

Nevertheless the same strategies that optimize cache reuse of pixel/voxel accesses will also optimize present macroscopic tile access problem. When transferred to present problem these strategies result in Tiling: create macro tiles of tiles, that are small enough so that cache locality effects are possible Swizzling: store tiles in macro tiles, that recursively consist of smaller macro tiles Hilbert curve: store tiles using an indexing scheme that is defined by a Hilbert curve.

Assuming that volume rendering is done within the tiles, it is known that the orientation of the viewing volume can strongly affect caching behavior when the volume is stored as a linear slice array. Since this linear storage format is very common this is taken into account.

According to an example embodiment of the application an optimized dynamic tile enumeration scheme is generated that rearranges the tiles for every frame. The dynamic tile arrangement satisfies tile locality and additionally further minimizes cache thrashing by exploiting the volume orientation.

Cache symmetry is achieved when the tiles that are identified by the indices in regular and reverse order are arranged so that they are all point or axis symmetric. This means that there is a self-symmetry that maps indices that result from having traversed the same number of indices in each direction onto each other.

Tile Enumeration that Dynamically Optimizes Cache Reuse for Volumes Stored in Linear Format As mentioned above the caching behavior of the volume renderer is strongly influenced by the orientation of the volume relative to the viewing camera when doing volume rendering on a volume data format that stores the volume as a linear slice array.

In US 2011/0170756, the entire contents of which are hereby incorporated herein by reference, an algorithm was presented that allows overcoming this issue for calculating the volume samples on a regular grid, which e.g. is satisfied in the case of volume rendering using an orthographic projection. In case of a 3-dimensional block within a 3-dimensional regular grid, it was shown how to find a permutation of the sampling positions that optimizes cache reuse, when sampling the volume voxels in a sequence that is defined by that permutation. In US 2011/0170756 the algorithm is based on a sampling access pattern which allows to access cubes of an n-dimensional volume optimally. This access pattern is modified to be used as an enumeration scheme for generating a sequence of tiles within a region.

For a block B of size (2x, 2y, 2z) within the grid, a recursive subdivision scheme was defined, where for each of the 3 possible subdivisions a measure function was applied that has the property to measure which of the sub-blocks resulting from the subdivision will be most cache friendly to sample. As a result, a 3-ary number was created, that uniquely describes the block subdivision sequence that optimizes cache reuse. The idea here is that in the case of a linear stored volume, when fetching volume data, a large amount of neighbour voxels in the cache have same y-z coordinates in volume voxel space. Exploiting this property, a metric was proposed that was based on the idea to use the area of the projection of all touched voxels onto the y-z coordinate plane in voxel space.

Let T be the affine transformation that maps the coordinate system in which a regular grid is defined into voxel space. Let P be the projection operator that projects the voxel space onto the y-z plane, then the formula for the average cache measure function $f(B)$ can then be formulated as:

$$f(B)=|p_x \times p_y|+|p_x \times p_z|+|p_y \times p_z|+1.72(|p_x|+|p_y|+|p_z|).$$

Here, the vectors $p_x$, $p_y$ and $p_z$ result from applying P onto the edges of a parallelepiped that is described by the block B.

In present case, it is not necessary to sample a volume along a regular grid, but to find a sequence for traversing tiles. Within each tile, it is known that volume data is accessed by doing volume rendering; any other special assumptions are not made. The principle idea proposed in US 2011/0170756 can be extended so that it can be applied to present problem if the volume rendering unit uses an orthographic projection:

Let tx and ty be the 2D vectors that describe a tile and let tz be any vector that is parallel to the viewing direction of a camera. Assuming these vectors form a block B and assuming a regular grid sampling would occur in such a block. In such a case the metric above could be used, where the vectors px=P(tx), py=P(ty) and Pz=P(tz) result from applying the projection operator P on tx, ty and tz.

Since present case refers to a macroscopic setting where vectors tx, ty and tz are large compared to a voxel size, the term $$1.72(|p_x|+|p_y|+|p_z|)$$

is small compared to the rest of the expression. For the macroscopic problem constellation the term may be simplified to receive:

$$f(B)=|p_x \times p_y|+|p_x \times p_z|+|p_y+p_z|$$

This metric should be used to decide if the length of the vector tx or ty should be halved. For such operations the first term in both cases gives the same result, so the metric can be simplified further to:

$$f(B)=|p_x \times p_z|+|p_y \times p_z|.$$

As long as the vector $P_z$ has non-zero length, this expression can be written as:

$$f(B)=|p_z||p_x \times e_z|+|p_y \times e_z|.$$

Here ez is the unit length vector of Pz. Again here the term |pz| is not relevant for the operation on which the metric should be applied on. This again results in simplifying the expression and to finally receive:

$$f(B)=|p_x \times e_z|+|p_y \times e_z|. \tag{1}$$

In the case that |pz| is zero and hence |ez| does not exist, the metric $f(B)$ is zero, indicating that in this special case none of the two possible splits has any advantages from a metric point of view.

In this final metric $f(B)$, the length of the block along the viewing direction does not occur, only the viewing direction and the projections that span up the tile have an influence. Because of this independence along the viewing direction, this metric is excellently suited for present purposes. Therefore, this metric will be used, as described in the following to derive a view dependent binary tile subdivision scheme.

Definition (Binary Tile Subdivision):

Assuming there is a rectangular region that consists of tiles that all have the same size. Let the number of tiles in x-direction be 2x and the number in y-direction be 2y. Let's identify a tile halving using a line in x direction with the digit 0, and a tile halving in direction y with the digit 1. Using this definition it is possible to recursively subdivide such a region of tiles until arriving at a single tile. The subdivision scheme can be described by a binary number.

The set of all such binary tile subdivision schemes is described by the set of all binary numbers with (x+y) digits, where the digit 0 appears x times and the digit 1 occurs y times.

Having defined a metric that allows to decide which split of a rectangular region leads to a region that touches in average less cache lines, it is now possible to describe a dynamic tile subdivision scheme that is mathematically analogous to the volume sampling scheme of a block within a regular grid described in US 2011/0170756, but for a macroscopic scenario that can only exploit tile locality information.

Dynamic Tile Subdivision

When subdividing an image region, we calculate which of the 2 possible subdivisions leads to the smaller metric value. The subdivision that creates the smaller one is then chosen. By doing this decision step recursively, we arrive at a binary number that describes the subdivision scheme. Each subdivision scheme leads to a different enumeration of the tiles within the start region. In cases where both subdivision lead to the same metric value (using an epsilon larger than zero that describes when we consider the metric as identical), we count this cases and for an uneven count we use the digit 0 and for an even one we use the digit 1.

Static Tile Subdivision

When being able to define a dynamic subdivision scheme, analogous to US 2011/0170756 it is then also possible to define a subdivision scheme that predefines the digits of the binary number describing a subdivision scheme. A well known static subdivision scheme is described by alternating the digits 0 and 1 when describing small regions and then filling the remaining digits with 0 or 1, depending what side of the rectangular region is larger.

The static subdivision is a special case of the general swizzling scheme that has excellent locality properties.

In the case where the vector $|e_z|$ does not exist, both tile subdivision steps leads to the same metric. The count modification we added for the special case where the metric is identical, leads in that case to the static subdivision scheme. This guaranties that locality is preferred in cases where the metric does not give a clear hint which subdivision is more cache friendly.

The dynamic and the static scheme can also be used in a mixed combination, e.g. where the digits that describe the smallest behavior up to the number of threads within a socket using the static approach, while the dynamic approach is used for the remaining digits. In this respect it has to be pointed out that static tile subdivision can be used for orthographic and for perspective projection as well.

So far the assumption has been made that the image regions are rectangular and have a number of tiles in x and y direction that is a power of two. In the general case when this is not the case, the enumeration is created with the following straightforward modification:

The enumeration E is created for the smallest of all regions that satisfies the power of two property and that contains the given arbitrary region A new enumeration is created from the enumeration E by removing all indices that belong to tiles that not belong to the region. The holes in the enumeration can then be removed to receive again a sequence of indices.

In the following the steps that describe the algorithm for the case when there are R sockets is summarized:

Predefine a tile enumeration scheme with good locality properties that allows to enumerate all tiles in the image. If volume orientation properties should be exploited in order to gain additional caching benefit for special orientations, use the dynamic scheme. In all other cases the static subdivision scheme leads to performance results that are for average orientations not far away from the dynamic scheme. Alternatively also other enumeration schemes that have good locality properties can be used, e.g. using enumeration schemes resulting from the Hilbert curve.

Create an initial decomposition of the image into R/2 regions; this can be achieved by decomposing the tile enumeration indices into R/2 subsets that have the same number of tiles.

When a thread is ready to render a tile, check on which socket the thread is currently running, then query the next tile for this socket from the dynamic load balancing algorithm we proposed. The dynamic algorithm takes care that tiles assigned to different sockets will have minimal interference with each other, while cache reuse with tiles queried from threads of the same socket is optimized. All threads belonging to the same processor socket are treated equally, there is no distinction here—just the information on which package a thread runs is used.

When a region is finished, perform a split of the region that has the most work left and continue.

A volume rendering algorithm receives then the information which part of the image is described by the tile and calculates that part of the image. There are no restrictions on the kind of volume rendering that is done within a tile and what strategies to optimize performance are internally applied (only for the dynamic tile enumeration scheme it was assumed an orthographic projection; for the perspective orientations best results are achieved using static scheme or the Hilbert curve). However, it is known that this algorithm will have to touch volume data to calculate the samples and that some cachelines will be left in the last level cache on processors with sufficiently large caches.

If threads are not locked, it is helpful to query to which socket the thread belongs for each tile, since the thread could be dynamically reallocated to another processor package by the operating system. If threads are locked to cores, this only has to be done once initially.

However, in a windows operating system implementation it was noticed that the query to determine the socket has very low overhead and a relocation to a different socket only occurred very rarely, so here it was not necessary to lock down the rendering threads.

The performance gain that is achieved depends to a large degree on the concrete LLC size and the number of sockets. On latest server processors (for example on an Intel developed microarchitecture like Sandy Bridge) in a dual socket configuration we have seen up to nearly 10% overall performance gain, compared to a dynamic approach that did not differ between the sockets. Since LLC caches will continue to increase with the number of cores in upcoming processors, our algorithm will produce even more impressive performance results on such future systems.

Modifying the Algorithm to Become an Adaptive Decomposition Scheme

The algorithm that was presented so far is a dynamic tile decomposition algorithm that is not adaptive. However, the algorithm can be modified to become an adaptive algorithm.

Assuming that for each tile there is provided a number $c_i$ that describes the expected workload that is necessary to render the tile. Such a number could e.g. result from using the workload of each tile from the last frame during an interaction, or from using the number of expected sampling positions within a tile, or from any other technique that is used by existing adaptive algorithms. Once for each tile such a number is available, this data can be used to modify our algorithm in 2 ways:

Use the expected workloads of the tiles to create initial regions that have the property that the sum of the workload of their tiles is distributed equally across the regions.

Use the expected tile workload numbers when doing a split operation. The split we have presented assumes that all tiles have approximately the same workload and hence the split operation will split just the number of tiles equally. When the workload numbers are available we can modify the split so that the sum of workloads is distributed equally, not the number of tiles.

This modification allows—in average—to further minimize the number of occurring splits that can occur. This adaptive modification only should be used for the case when the number of sockets is larger than 2, since the 2 socket case is already split free and the adaptive modification will thus bring no benefit. Of course the adaptive modification creates some additional overhead, so the adaptive variant is only of interest when the expected workload numbers can be gained very efficiently.

Generally, embodiments of the method mentioned above may be implemented in software or in computer code to be executed on a computer. Alternatively, embodiments of the method may be implemented in a graphics processing unit (GPU) or in hardware modules combined with software modules. The hardware modules are then adapted to perform the functionality of the steps of the embodiments of the method, described above. Accordingly, it is also possible to have a combination of hardware and software modules. The modules are preferably integrated into an existing medical computer-based environment.

Another example embodiment of the invention is to be seen in a computer program being loadable in a memory of a computer, wherein the computer program is adapted to carry out the steps of the embodiments of the method as mentioned above.

Moreover, embodiments of the invention relate to a computer readable medium including program instructions which when executed by a processor of a computer system cause the processor to perform the method for image rendering on a shared memory system with one or multiple processors as described above.

With respect to FIG. 1 a volume rendering system is described comprising an image acquisition system, like a CT-system or an MRT-system or the like, which is depicted in FIG. 1 by reference numeral CT. The modality is coupled by a network NW to a server system for image or volume rendering to be displayed on a monitor M.

Figure 2:
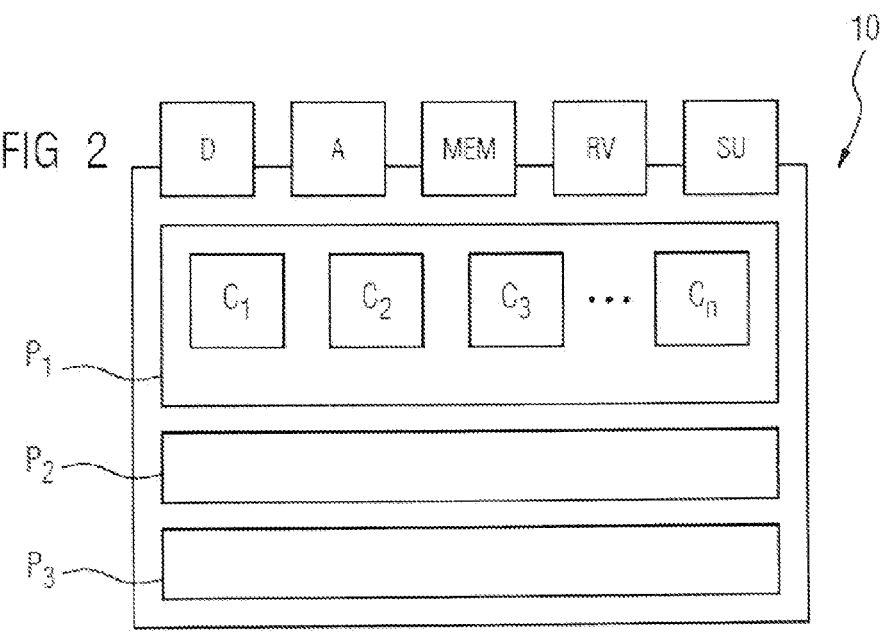
FIG. 2 is a schematic diagram according to one embodiment of a rendering system with a plurality of processors, including multi core processors.

FIG. 2 shows a rendering system 10 comprising several processors P1, P2, . . . Pn. Typically, each of the processors P may comprise one or more processor cores C1, C2, . . . Cn and is therefore called a multi core system. Each of the cores C accesses a cache 12 or a cache hierarchy with several caches with different access performance. As multi core processors become pervasive and the number of on-die cores increases, a key processor design issue is the hierarchy and the policies for the on-die last-level cache LLC and thus for algorithms taking into account an efficient cache hierarchy to reduce off-chip data misses and to provide fast memory access. A last-level cache LLC may be organized in a distributed manner around a scalable on-die interconnect. The last-level cache can be private or shared form the cores C. The rendering system 10 comprises or interacts with several units, which may be implemented in hardware: a decomposition unit D, an assigning unit A, a memory MEM, a rendering unit RU and a splitting unit SU. The above mentioned units are adapted to execute the steps of the corresponding method and may be implemented an on-die module.

At least one embodiment of present invention relates to volume rendering and is based on the category of image space decomposition, in which the image space used for rendering the result image is decomposed in tiles T.

Figure 4:
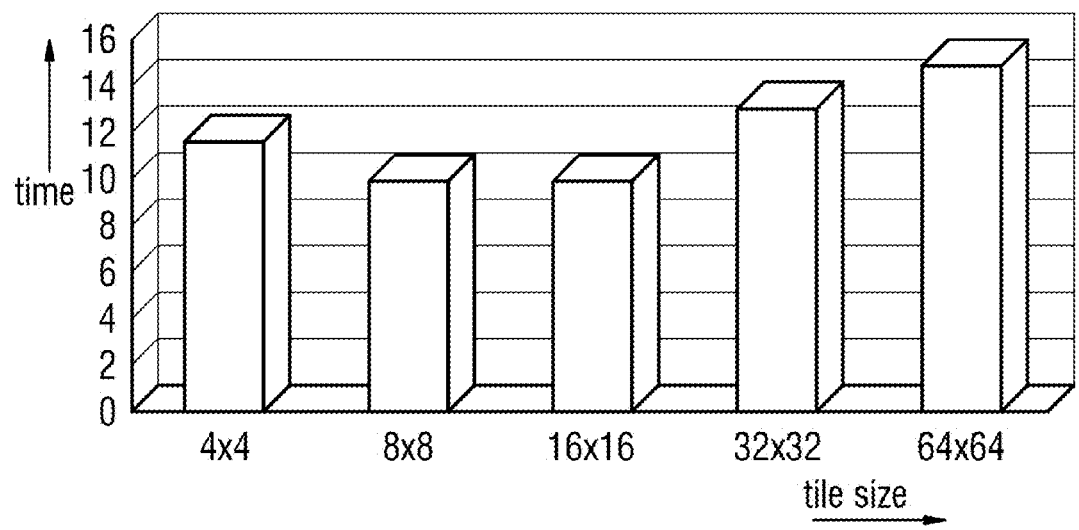
FIG. 4 is a graph depicting a performance of an overall system in relation to tile size.

Generally, when doing volume rendering, the image tile size influences the overall rendering time. Many factors influence the performance, some factors benefit from smaller tiles, other from larger tiles. Overall, one can often see a performance curve, which is depicted in FIG. 4, when analyzing how the tile size influences the performance. As a result, one chooses the tile size that gives overall the best performance results, which in the example shown in FIG. 4 shows that one will choose a tile size of 8×8 pixels.

The LLC size increase of modern processors is just one of many factors that influence the performance graph, depicted in FIG. 4. Thus, increasing the tile size is not a solution which allows exploiting the presence of large last level caches LLC. A major advantage of the method according to one preferred embodiment of present invention is therefore to be seen in that the algorithm can be used independently from the chosen tile size that delivers best performance of the tile volume renderer. This fact allows to choose the tile size independently to optimize volume rendering performance and allows the algorithm to exploit large LLC-caches from a macroscopic point of view.

Figure 3:
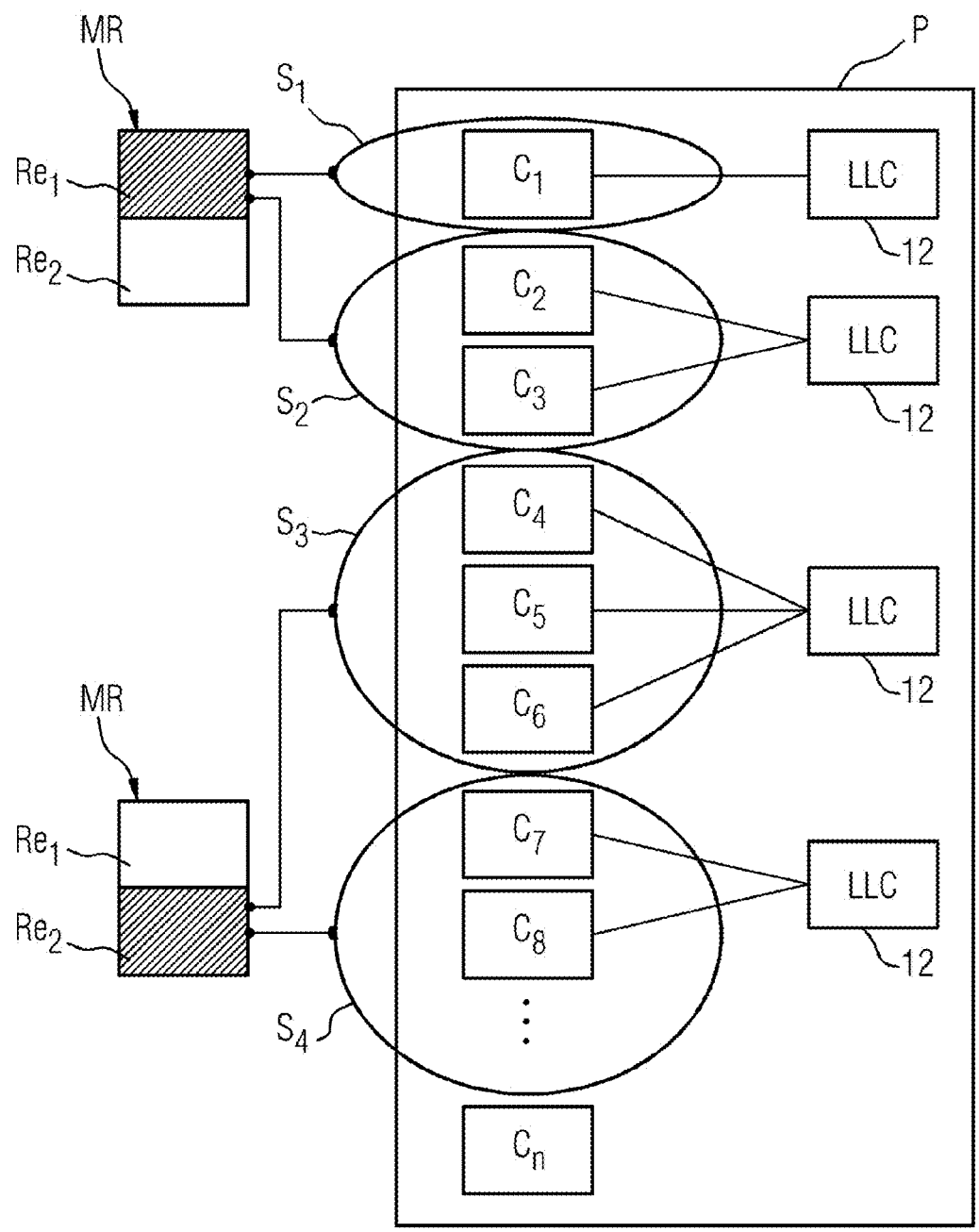
FIG. 3 is a schematic diagram of a multi core processor with multiple cores being assigned to tiles of a region.

According to an embodiment the invention each of the processors P comprises several cores C which access last level caches LLC. Typically, at least one of those caches LLC is shared between several cores C. This is depicted in FIG. 3, where the assignments of last level caches LLC to cores C is represented by a respective connection line. Those cores C which share one single last level cache LLC are defined as a socket S. In the example schematically shown in FIG. 3, core C1 has a private LLC, the cores C2, C3 share a second LLC, the cores C4, C5, C6 share the third LLC and cores C7, C8 share a fourth LLC. Accordingly, four sockets are generated: S1, S2, S3, S4, which may be denoted as: R=4, wherein R being the number of sockets S.

According to an embodiment of present invention the image space is to be decomposed in half of the number of sockets, namely into R/2 regions. Each region Re is assigned to a pair of sockets (two sockets) in order to render the tiles T in that region Re. This is depicted in FIG. 3 by the connection lines between the sockets S and the respective regions Re within a macro-region MR. The macro-region has a rectangular shape and is decomposed in an upper half Re1 and into a lower half Re2. In the example shown in FIG. 3 the upper half is assigned to sockets S1, S2, whereas the lower half is assigned to the rest of the sockets S3, S4. The assigned area is depicted in FIG. 3 as hatched area.

In case of a 2 socket scenario there will be only one single region Re and there will be no splitting.

Figure 5:
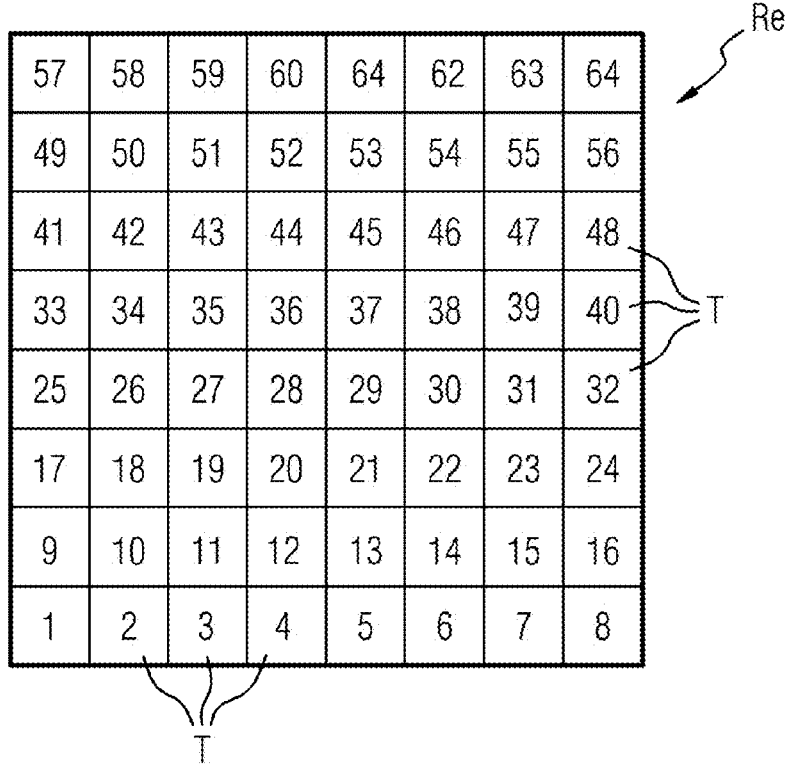
FIG. 5 is a schematic representation of a region that should be rendered consisting of a plurality of enumerated tiles.

FIG. 5 shows by way of example a region Re, which should be rendered and which is decomposed into 64 tiles T, where each tile T consists of a pixel rectangle that is chosen to have the size that allows the volume renderer that calculates the tiles T to achieve best performance (tile edge sizes do not have to be a power of 2).

Ignoring the size of the pixel rectangle that defines the size of the tiles, but considering the set of tiles T that form a region Re. Each square in FIG. 5 is one of the tiles T into which the region Re is decomposed. The tiles T are enumerated with indices ranging from 1 to 64 and this enumeration defines in which sequence the tiles T will be rendered. In this example, the tiles T are enumerated linearly in scanline order, which is the typical enumeration used in existing tile decomposition algorithms. If caching effects can be ignored the tiles T can be handled in our scenario in any order, without a noticeable difference in overall rendering performance. However, with upcoming new processors that have massive LLC sizes, this is no longer true.

The linear scanline enumeration will not achieve optimal cache reuse, since it lacks locality properties. Usually each tile will in such a scenario only have 2 tiles that will be handled close enough to benefit from data that was left in a LLC during the rendering of a tile T.

With respect to FIGS. 6, 7 and 8 there will be described FIG. 6 some of the possible tile enumeration schemes for a simple 4×4 tile region. In these examples, shown in FIGS. 6 to 8 it will be seen, how these approaches can be used to create indexing schemes.

FIG. 6 refers to a linear scanline enumeration. FIG. 7 refers to an enumeration that is defined by a Hilbert curve.

FIG. 8 shows an enumeration as defined by a static decomposition using the binary number "1010", where first the tile region is recursively first halved along the y direction, and then in the x direction.

As one can see the Hilbert curve enumeration forms a curve that is never interrupted across the set of all tiles T.

The static subdivision has the nice property that all subdivision regions have many self-similarities.

As one can see all 3 enumeration schemes satisfy the symmetry conditions between a regular and reverse indexing. The linear and the static subdivision enumeration are point symmetric, while the Hilbert curve is axis symmetric along the y-axis. In all cases neither the regular nor the reverse indexing traversal has an intrinsic advantage against the other traversal.

A dynamic subdivision scheme will be described with respect to FIG. 9. Generally, the subdivision scheme can be described by a binary number, as can be seen in FIG. 9 below the 4×4 field, representing the tiles T.

This scheme takes into account the volume orientation against the viewing camera for volumes stored as linear slice array. Assuming that the initial region consists of 16 tiles T that are arranged in a 4×4 way, there are 6 possible results for a dynamic decomposition, which are shown in FIG. 9.

Which one of the possible subdivision (note: subdivision is to be construed as a general term for splitting and decomposing an image area) schemes will in fact be created for a concrete situation is defined by the decision metric $f(B)$ according to an embodiment of present invention. By evaluating the metric for each of the two possible decompositions we receive a measure that indicates how cache friendly the split result becomes, so that we decide to choose the more cache friendly. The first split decides the form of the regions defined by the indices 0-7 and 8-15, the remaining splits recursively define the remaining indices by halving the tile regions.

Figure 10:
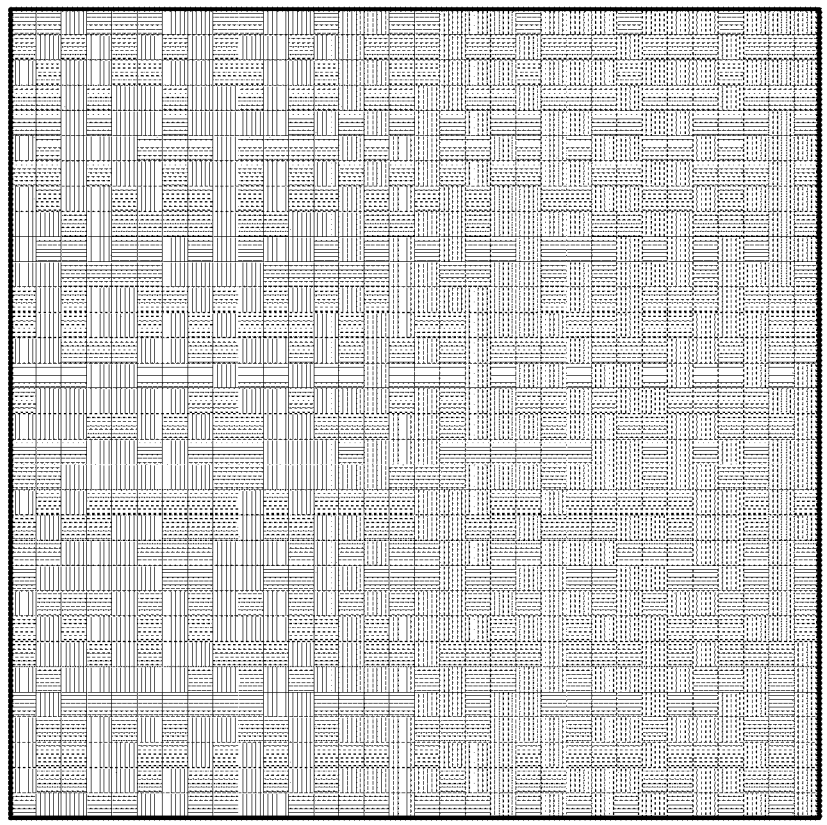
FIG. 10 is an example graphical representation of a dynamic tile decomposition scheme on a 2 socket system.
Figure 11:
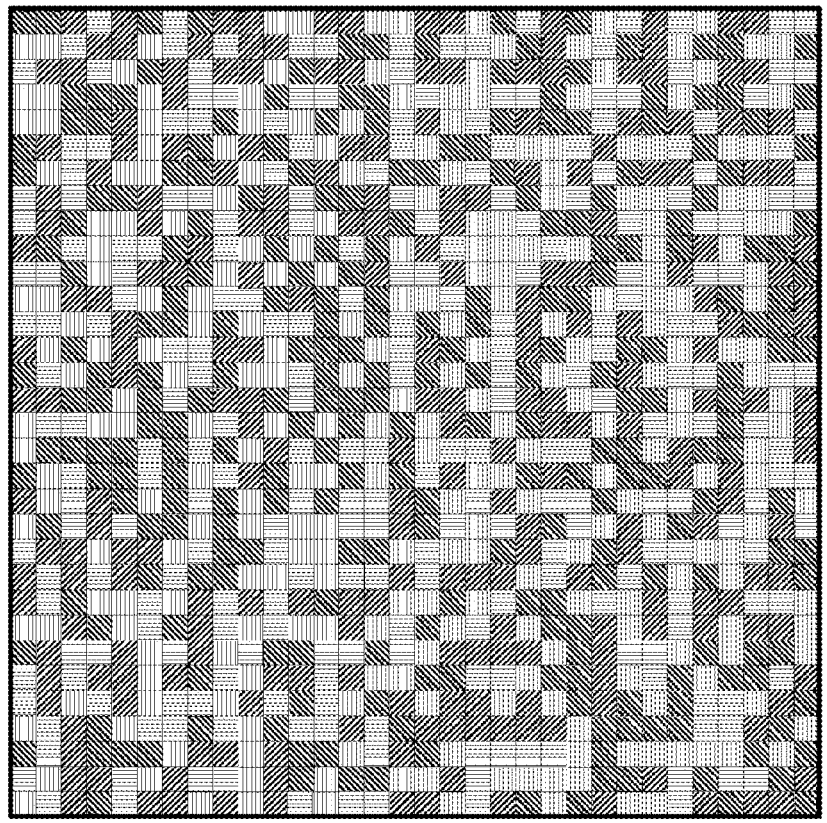
FIG. 11 is an example graphical representation of a dynamic tile decomposition scheme on a 4 socket system.

With respect to the examples shown in FIGS. 10 and 11 it is shown that where multiple processors P on multiple sockets S are involved, tile locality only then increases cache reuse when the neighboring tiles T are all handled by the same socket S. Otherwise the tiles T do not share a common LLC and hence will not benefit. In the example shown in FIG. 10 a typical dynamic tile decomposition scheme on a 2 socket system is shown. FIG. 11 represents the 4 socket system, where dynamic load balancing is done, but without taking tile locality into account.

In this example, shown in FIGS. 10 and 11, tiles T that are handled by the same socket S are shaded or hatched in the same manner. Since on each socket S there is a multicore processor P, multiple threads are assigned to each socket S.

As one can see, there is hardly any cache reuse happening in such a scenario, since only tiles T with same shading or emphasis have a chance, and only if they are also within the sequence close enough together. The larger the number of involved sockets S, the lesser the chance that any cache reuse will occur.

As mentioned above modern processors have an increasing number of cores C, combined with an increasing LLC size. The larger the LLC becomes, the more likely it is that cached data—mostly volume data—is still present in the LLC. It is therefore a design goal that the resulting dynamic tile scheduling scheme has to take care that threads that reside on the same physical processor socket S have large tile locality. Various points have been taken into account here:

Handle tiles T on the same socket S with optimized locality properties.

The volume storage format can influence the locality properties.

On multi socket systems take care that locality is not destroyed by interference with other sockets S.

Figure 12:
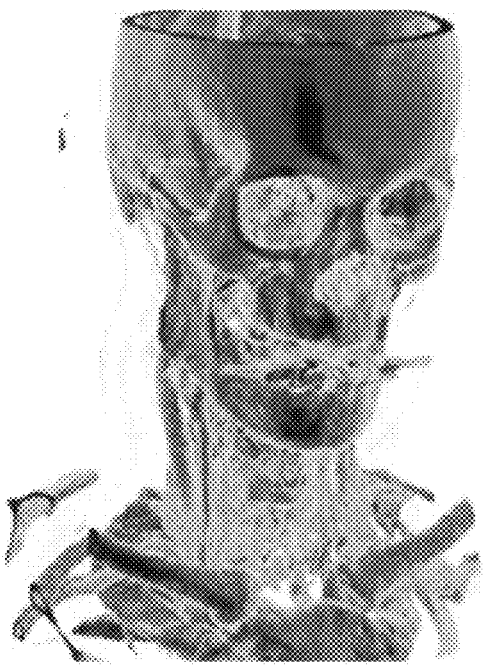
FIG. 12 is an example graphical representation of a resulting rendered image (shown on the left side) for a 2 socket tile distribution scenario (shown on the right side)
Figure 12:
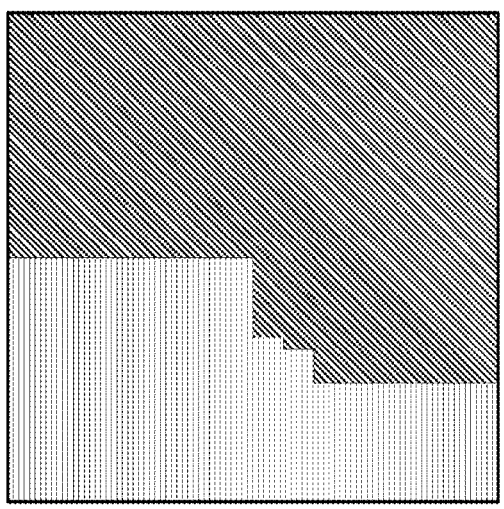

FIG. 12 shows an example of a resulting image (shown on the left side of FIG. 12) with a dynamic tile decomposition for a 2 socket scenario when using the algorithm according to a preferred embodiment of the invention. The 2 socket tile distribution is represented on the right hand side in FIG. 12. No adaptive decomposition modification is done here, only the dynamic tile decomposition, which has been described above. As one can see, in this example the workload is distributed very differently across the tiles T. Most tiles T that render the skull hit a bone and can heavily benefit from early ray termination, while e.g. the tiles T rendering the tissue below the skull are more demanding since they have to handle transparent parts.

As one can see the algorithm excellently adapts to the workload differences, without having to use adaptive techniques. Since no split can occur, the 2 socket algorithm finds an optimal solution for the problem.

Figure 13:
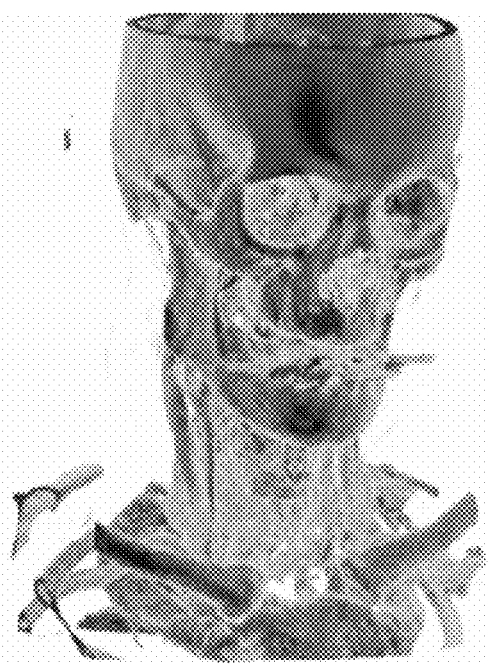
FIG. 13 is an example graphical representation of a resulting rendered image (shown on the left side) for a 4 socket tile distribution scenario (shown on the right side)
Figure 13:
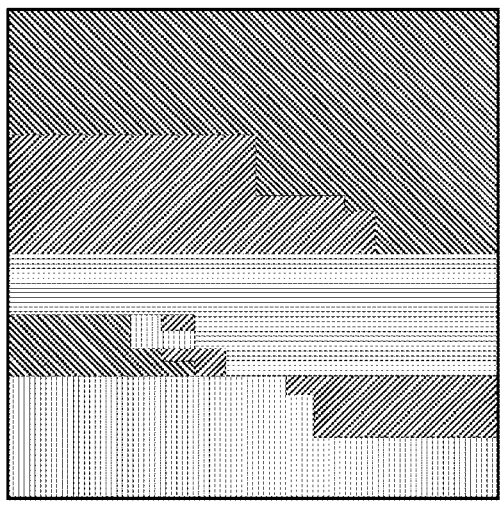

FIG. 13 shows an example of a resulting image (shown on the left side of FIG. 13) with a dynamic tile decomposition (represented on the right side) for a 4 socket scenario when using the algorithm, presented above. No adaptive decomposition modification is done here. The rendered image here was the same as in the 2 socket example.

As already explicated, according to a preferred embodiment the split is only done when there is work left (tiles un-rendered). During a split the tile indices are recalculated so that each resulting region receives halve of the number of remaining tiles (see FIG. 13).

In the scenario, depicted in FIG. 13, the image is initially decomposed into two regions Re, where to each region Re two sockets S are assigned. One initial region is the upper halve of the image (assigned the diagonal right striped and diagonal left striped sockets S), while the second one is the lower halve of the image (assigned the horizontally striped and vertically striped colored sockets). Since the upper region can be calculated faster, the pair of sockets S is finished earlier and a split of the lower region is triggered. The vertically striped and horizontally striped sockets S can continue unaffected, while the diagonal right and left striped sockets start new work. Later the pair of sockets S defined by horizontal striped and diagonal right striped finishes earlier and the remaining region is split. Finally one region finishes again earlier and triggers a last split.

Overall here only 3 splits occurred, demonstrating how excellently the algorithm is able to cope with large image workload differences automatically—even when not applying additional adaptive techniques. Of course adaptive techniques could be additionally applied, with the effect that the overall number of occurring splits would be additionally reduced if the number of sockets S is larger than 2. With adaptive techniques that take the expected workload of a tile T into account one would use that information to create other initial regions Re and would do splits so that the expected workload is distributed evenly, and not the number of tiles T as in this example.

With reference to FIG. 14 a flow chart is described according to an example embodiment of present invention. The method may be divided in two time phases: A configuration phase, which mainly may be used to defining an enumeration scheme and a rendering phase which will be used for rendering.

After starting the system in step 100 a tile enumeration scheme is predefined.

In step 105 a pair of sockets S will be assigned to a macro region MR.

In step 110 an initial decomposition of the image that have the same number of tiles T is created in R/2 regions Re.

In step 120 the tiles T of the decomposed macro region MR is rendered by the assigned pair of sockets S.

In step 130 there is a query: When a thread is ready to render a tile T, check on which socket S the thread is currently running, then:

In step 130: query the next tile T for this socket S from the dynamic load balancing algorithm. The dynamic algorithm takes care that tiles T assigned to different sockets S will have minimal interference with each other, while cache reuse with tiles queried from threads of the same socket is optimized. All threads belonging to the same processor socket S are treated equally, there is no distinction here—just the information on which package a thread runs is used.

Step 140: Check, if a region Re is rendered completely. When a region Re is finished, then go to step 150. Otherwise go back to step 130.

Step 150: Perform a split of the region Re that has the most work left and continue. A volume rendering algorithm receives then the information which part of the image is described by the tile and calculates that part of the image.

In step 160 it is analyzed whether the image is rendered completely. If yes, the method ends. Otherwise go back to step 130.

At least one embodiment of the invention may show at least one of several advantages:

Compared to existing dynamic load balancing algorithms for tiles, the presented method has the advantage that it allows to exploit the LLC increase in modern hardware, which took place in latest years. It is guaranteed that tiles T belonging to the same socket S are calculated so that LLC reuse is optimized. In multi socket cases, the algorithm additionally takes care that each socket S does minimize its influence on the caching behavior of other sockets S. Since the number of cores C in multi-core processors will steadily increase and hence typically also the LLC size, the performance advantages of this algorithm will continue to increase also steadily with future hardware.

The dynamic tile enumeration scheme allows to exploit on the fly the orientation of a volume stored as linear slice array to further optimize cache reuse. This enumeration scheme has nearly no overhead and can easily be applied dynamically.

For systems up to 4 sockets, especially efficient implementations are possible that are non-blocking using atomic instructions. These implementations are also very efficient in extreme situations, since the critical step—the region split—is handled by atomic instructions. There is no possibility that a split is interrupted by the operating system. Moreover, since all threads of the socket pair that triggers the split are able to do the split, it is guaranteed that the split causes minimal overhead. Since 2 and 4 socket systems are by far the most common multi socket systems, these special cases can often be applied in practice.

In the general socket case (>4) the algorithm minimizes the effect of locking, since here locks are only required to protect the split, while being untouched for all other cases. And due to the design of our algorithm splits conditions are rare.

In the 2 socket case, the algorithm solves the given problem perfectly, since here no split is possible.

The complexity reduction property of the algorithm R->R/2 allows from many points of views to convert an R socket system to an R/2 socket system.

The algorithm is very well suited to smooth out effects arising from having a very irregular load distribution within an image, as it is often the case for volume rendering, where opaque and transparent regions can be interleaved in complex patterns. It is much less dependent on a good approximation of the initial workload (number of tiles T) assigned at the start of the algorithm (particularly in an adaptive case).

While the algorithm was designed for volume rendering applications, it is general enough to be used in similar situations, where cache reuse across tiles on a multi socket system has to be optimized. This can also be of interest for more general rendering problems.

Finally, at least one embodiment of the invention can be summarized as follows:

There is provided a computer implemented method for image tile load balancing, which is excellently suited for optimizing cache reuse across tiles for volume rendering applications on general multi socket systems. The method is a dynamic scheme that guarantees that each socket S achieves optimal cache reuse with minimal interference of other sockets S, even in situations where the workload within the image is distributed with large differences. The algorithm can be implemented very efficiently, which guaranties that threading overhead is minimal. For the 2 socket case the method may be implemented as a non-blocking algorithm using just one single atomic operation.

A metric $f(B)$ is provided that allows to detect which of two possible tile subdivisions is more cache friendly for volume rendering with volumes that are stored as linear slice array. Only the size of the tile, the viewing direction and the orientation of the volume relative to the viewing camera are required as input parameters. The camera is an orthographic camera (for the dynamic case).

A dynamic algorithm is provided that uses the metric $f(B)$ to find an enumeration of the tiles T that allows to optimize cache reuse across the tiles for volumes stored as linear slice array.

A static tile enumeration scheme is generated for the index sequence of a region that is excellently suited to optimize cache reuse within a processor. This static scheme alternates recursively splits between the x and y axis of the region. In the static case the camera may be orthographic or perspective.

A tile enumeration scheme is generated for the index sequence of a region that is excellently suited to optimize cache reuse within a processor using the Hilbert curve.

A storage format for a pair of sockets is provided that is very well suited to be used for atomic instructions. It was also shown how to optimize this storage format to minimize the number of bits required.

Very efficient non-blocking implementations of the 2 and 4 socket case using atomic instructions is provided.

It was shown how to modify the algorithm so that is becomes an adaptive decomposition scheme. The expected workload numbers are used to create initial regions that have equal workload and are further used to create splits that create sub-regions that have equal workload.

The example embodiments are to be considered in all respects only as illustrative and not restrictive. The scope of the invention is, therefore, indicated by the appended claims rather than by this description. All changes which come within the meaning and range of equivalency of the claims are to be embraced within their scope.

REFERENCE NUMERALS

CT image acquisition device
10 Rendering system
M Monitor
NW Network
C Processor Core
P Processor
S Socket
D Decomposition unit
A Assigning unit
MEM Memory
RU Rendering unit
SU Splitting unit
Cache
LLC Last Level Cache
R number of sockets
Re Region
MR Macro region
100 pre-define tile enumeration scheme
105 Assign two sockets to a macro region
110 Create initial decomposition of the image space in R/2 regions
120 render tiles of decomposed regions on a plurality of parallel threads
130 If one thread is free to render a tile: Query next tile for the socket by dynamic load balancing algorithm
140 Check if region is rendered completely?
150 Splitting the macro-region of un-rendered tiles
160 Check if image space is rendered completely?

What is claimed is:

1. A method for image rendering on a shared memory system with one or more processors, each of the one or more processors including at least one core, and one or more cores being assigned to at least one cache, and being configured to execute instructions of at least one thread in parallel, the one or more cores sharing a cache being defined in a socket, the method comprising:
    decomposing an image space to be used for image rendering into a plurality of regions, each of the regions including a plurality of tiles;
    first assigning available sockets to respective regions, wherein two sockets are assigned to each of the respective regions for the image rendering;
    determining a tile enumeration scheme for each of the respective regions to generate a sequence for calculating the tiles within the respective region, the tile enumeration scheme including a regular indexing and a corresponding reverse indexing;
    rendering tiles within the respective region until the respective region is finished, wherein a first of the two sockets assigned to the respective region processes tiles according to the regular indexing with an ascending order, and a second of the two sockets assigned to the respective region processes tiles according to the reverse indexing with a descending order;
    second assigning the two sockets, if the respective region is finished, to another un-rendered region among the respective regions;
    if no completely un-rendered region is left, splitting a region with un-rendered tiles, from among the respective regions, into sub-regions according to a splitting scheme; and
    applying the second assigning and at least one of the determining and rendering, recursively for the sub-regions.

2. The method of claim 1, wherein the one or more cores are at least one of physical and logical cores.

3. The method of claim 1, wherein the image space is decomposed or split into a number of regions according to at least half of a number of sockets.

4. The method of claim 1, wherein the tiles of a respective region are processable in a configurable sequence.

5. The method of claim 1, wherein the two sockets process the assigned regions in parallel.

6. The method of claim 1, wherein the tile enumeration scheme is static and pre-defined.

7. The method of claim 1, wherein the tile enumeration scheme is based on a Hilbert curve.

8. The method of claim 1, wherein the tile enumeration scheme is dynamic and is based on a metric f(B), the metric f(B) being usable to detect which of a plurality of possible decompositions or splittings has the best cache locality properties among the possible decompositions or splittings.

9. The method of claim 8, wherein the metric f(B) enables estimating, for a given orientation and a given volume, if a tile split in a x-direction or a tile split in a y-direction will, on, touch less cache lines.

10. The method of claim 8, wherein the metric f(B) is defined by: $f(B)=|p_x \times e_z|+|p_y \times e_z|$, with $p_x$ and $p_y$ being vectors in x- and y-directions, respectively, and $e_z$ is a unit length vector of $p_z$.

11. The method of claim 1, wherein at least one of the decomposing and splitting is not restricted to a specific geometric form and is based on different algorithms.

12. The method of claim 1, wherein the method takes into account an equal distribution of expected workload of the tiles to be rendered for the decomposing and splitting.

13. The method of claim 1, wherein two, four or more sockets are used for the image rendering.

14. The method of claim 1, wherein, upon two sockets being used, no splitting is executed and only a single atomic operation is executed.

15. The method of claim 1, wherein in case four sockets are used, splitting is executed only if necessary and by using atomic operations executed by a 128 bit instruction.

16. The method of claim 1, wherein the cache is a private or shared last level cache.

17. The method of claim 14, wherein, upon two sockets being used, only one atomic ADD-instruction is executed.

18. The method of claim 15, splitting is executed by using atomic operations being executed by a COMPARE-AND-SWAP-instruction.

19. A non-transitory computer-readable storage medium storing computer-readable instructions that, when executed, cause a computer to execute the method of claim 1.

20. An apparatus for image rendering on a shared memory system with one or more processors, each processor including at least one core, and one or more cores being assigned to at least one cache, and being configured to execute instructions of at least one thread in parallel, wherein cores sharing a common cache are defined in a socket, the apparatus comprising:

a memory configured to store a tile enumeration scheme for a respective region from among a plurality of regions of an image space for image rendering, each of the regions including a plurality of tiles, the tile enumeration scheme including a regular indexing in an ascending order and a corresponding reverse indexing in a descending order for tile calculation, the memory being further configured to store computer-readable instructions;

a decomposition processor configured to execute the computer-readable instructions to decompose the image space into the regions;

an assigning processor configured to execute the computer-readable instructions to assign two sockets to each of the regions for the image rendering;

a rendering processor configured to execute the computer-readable instructions to render tiles within a respective region according to the regular indexing on a first of the two sockets and according to the reverse indexing on a second of the two sockets until image rendering of the respective region is finished;

a splitting processor configured to execute the computer-readable instructions to if the respective region is finished, assign the two sockets to another un-rendered region, if no completely un-rendered region is left, split a respective region with un-rendered tiles into sub-regions according to a splitting scheme, and access the memory to determine a tile enumeration scheme for at least one of the sub-regions;

wherein the assigning processor is further configured to execute the computer-readable instructions to assign the two sockets from the finished region to a sub-region with un-rendered tiles; and wherein the rendering processor is further configured to execute the computer-readable instructions to render tiles within the sub-region according to the determined tile enumeration scheme until the respective sub-region is finished.

* * * * *